Mar. 13, 1923.

J. S. LANG.
SHOCK ABSORBER.
FILED DEC. 27, 1921.

INVENTOR:
James S. Lang

BY
Coale Hayes
ATTORNEYS

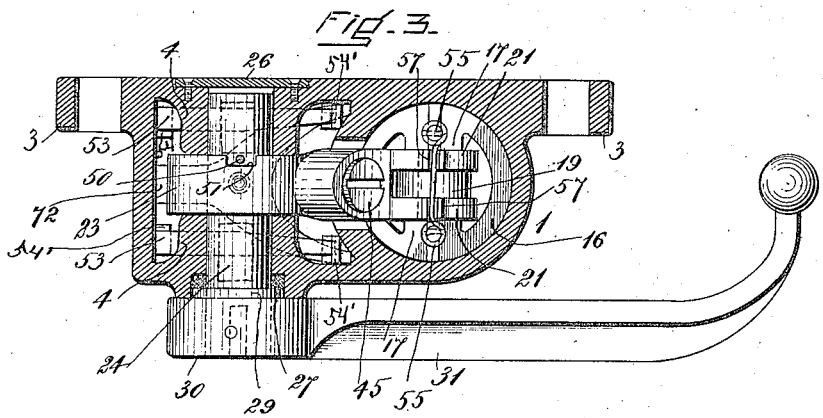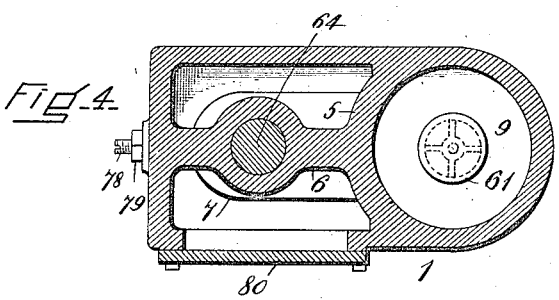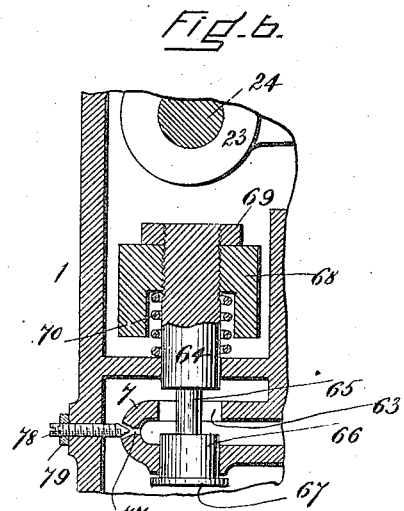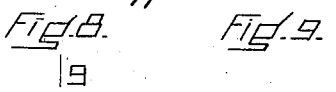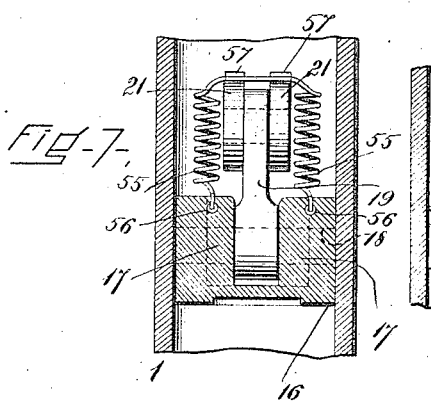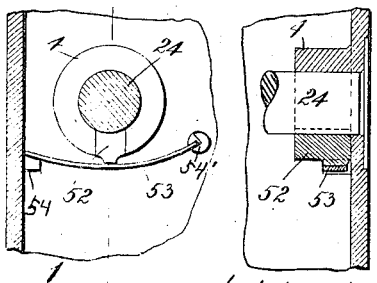

Patented Mar. 13, 1923.

1,448,131

UNITED STATES PATENT OFFICE.

JAMES S. LANG, OF WATERTOWN, MASSACHUSETTS.

SHOCK ABSORBER.

Application filed December 27, 1921. Serial No. 524,826.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention belongs to that class of shock absorbers which are especially adapted for motor vehicles and in which the force required to pass a fluid through a constricted opening is utilized to prevent excessive vibration or rebound.

Among the objects of the invention is to provide a generally improved shock absorber embodying among other things means for automatically varying the area of the opening or passage through which the fluid is forced and therefore the amount of force brought into play whenever such variation in the amount of force is required to effectually check the vibration or rebound of a vehicle body. It is also my object to provide compactness of construction, absence of fluid leakage, freedom from injury to the device due to unusual or accidental movements of the attached parts, sensitiveness of action and other advantages as may after be referred to.

The invention can best be seen and understood by reference to the drawings in which a shock absorber embodying the invention is shown, and in which—

Figure 1 is a side elevation of the shock absorber applied to the frame and axle of a vehicle.

Fig. 2 is a vertical section of the shock absorber.

Fig. 3 is a cross section thereof.

Fig. 4 is a section on line 4—4 of Fig. 2.

Fig. 5 is a section on line 5—5 of Fig. 2.

Fig. 6 shows partly in vertical section and partly in side elevation a detail of construction to which special reference will hereinafter be made.

Figure 1:
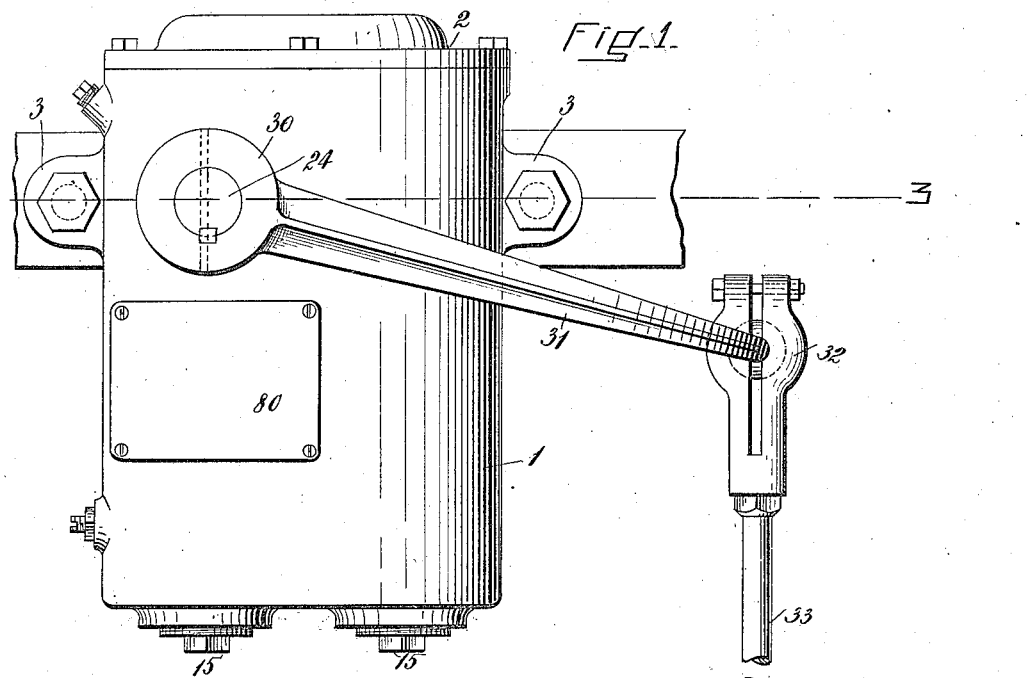
Figure 2:
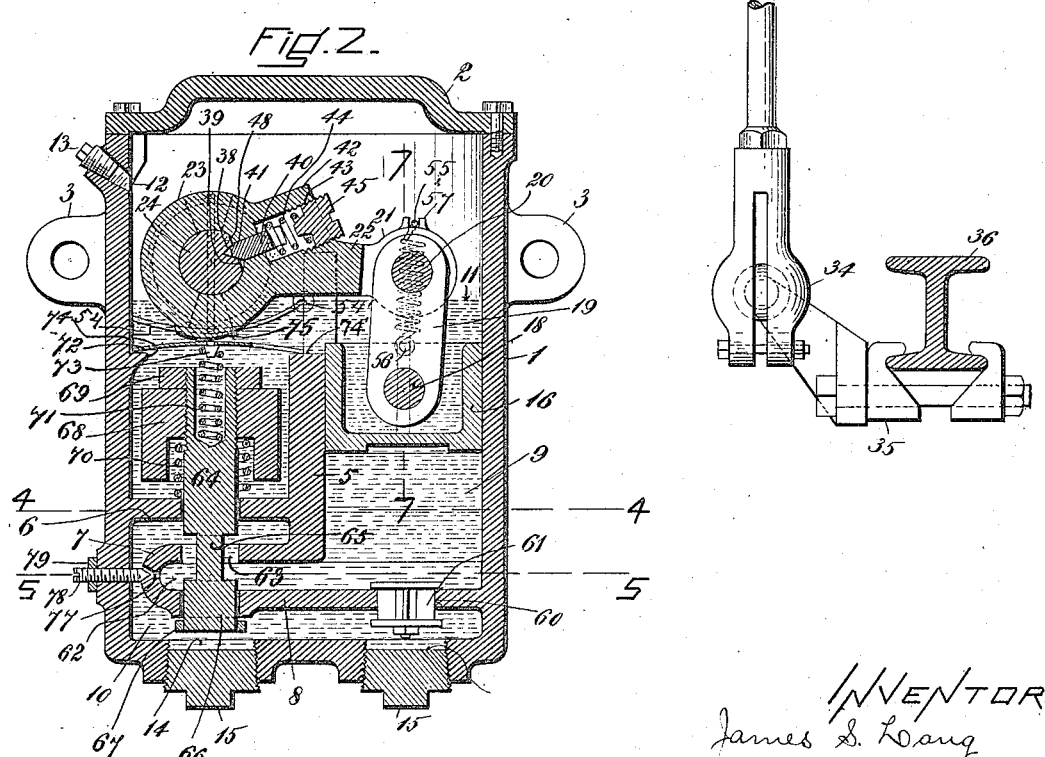

Fig. 7 is a section on line 7—7 of Fig. 2.

Fig. 8 is a side elevation of a detail of construction to which special reference will later be made.

Fig. 9 is a section on line 9—9 of Fig. 8.

Referring to the drawings:—

1 represents a casing having a removable cover 2. Projecting laterally from the casing are lugs or ears 3 by which it may be secured to the body or framework of a vehicle. On the inside the casing is provided with spaced bearings 4 for a rock shaft later to be referred to. The interior of the casing is also fitted with various walls or partitions, 5, 6, 7, 8, respectively, which provide within it a compression chamber 9 and outside this chamber immediately adjacent thereto a secondary or expansion chamber 10 with openings between the two chambers, certain of the partitions assisting in the valvular control of said openings. The casing forms a receptacle for oil contained within its respective chambers and maintained within the casing at about the level indicated at 11. Oil is admitted to the casing at the top by way of an inlet 12 controlled by a filling plug 13. At the bottom the casing is provided with outlet openings 14 closed by plugs 15. These openings provide outlets for the oil and also openings through which access may be had to certain of the operating parts later to be referred to.

The compression chamber 9 is within a cylinder formed by the co-operation of the wall or partition 5 with the wall of the casing. Contained to reciprocate within the cylinder is a piston 16. The piston is provided with interior spaced cheeks 17 within which a pin 18 is fixed to cross the space between the cheeks. Pivotally secured to this pin is a link 19 which is pivotally secured to a pin 20 fixed in the spaced ends 21 of a rocker arm 22. The rocker arm 22 is provided with a hub 23 secured, as will later be explained, to a rock shaft 24 which turns within the spaced bearings 4 in the casing above referred to, the hub 23 occupying the space between the bearings.

For convenience in finishing the bearings 4 for the reception of the shaft, a boring is made through the casing and the opening left on one side of the casing beyond one end of the shaft 24 when in place, is closed by a plate 26. On the other side the shaft extends through and beyond the casing. At the point of exit of the shaft from the casing, the casing is provided with a circular recess in which is contained any suitable packing ring 27 backed by an annular flange 29 on the shaft. Keyed to the end of the shaft, projecting beyond the casing, is a hub 30 bearing a rocker arm 31. The outer end of this rocker arm makes a ball and socket connection 32 with a connecting rod 33 which in turn makes a ball and socket connection 34 with a clamp 35 attached to the axle 36 of the vehicle.

With this arrangement of parts it will be seen that any change in the normal relative positions of the axle and vehicle frame or body due to inequalities in the roadway will act to move the piston 16 which is raised or lowered in the cylinder as the case may be.

Under certain circumstances the change in the relative positions of the body and axle may be so extensive, owing to unusual inequalities in the roadway, that the piston will strike the wall or partition 8 at the bottom of the cylinder or the rocker arm 22 strike the cover of the casing with danger of breakage. To guard against this, arrangement is made to permit of a slight relative movement between the rock shaft 24 and the hub 23 of the rocker arm 22 under heavy stress in proportion to such stress and under extreme stress to permit of further movement between the hub and rock shaft not in proportion to such stress. To this end the rock shaft 24 is provided with a socket having inclined sides 38, 39, respectively. Extending to fit in this socket is a key 40 having faces beveled to correspond with the inclined sides of the socket and fitting snugly therein when the key is in place. The key has a rectangular body which fits slidably within a deep keyway 41 in the hub 23. Back of this keyway the hub is provided with an extension or boss 42 having within it an interiorly threaded cylindrical chamber 43 containing a helical spring 44. One end of this spring bears against the rear end of the key holding it firmly against the rock shaft within the socket therein. The spring is backed by a screw plug 45 at the outer end of the spring chamber 43 and by the turning of which tension is put upon the spring.

In assembling, the key is placed in the keyway in the hub 23. The rock shaft 24 is then put in place and the key socketed in the shaft. Afterward the spring is placed in its chamber back of the key and then the plug inserted and tightened. Under normal conditions the key held by the key spring is firmly seated within the socket in the rock shaft, allowing no relative movement between the hub 23 and the shaft. If, however, the force transmitted exceeds the desired point determined by the tension of the key spring, the key will be forced back within its keyway in the hub, the spring becoming compressed. As the key is forced back a slight relative movement between the rock shaft and hub on the rocker arm takes place and the greater the stress, the greater such relative movement. When the stress reaches a danger point the key is forced entirely out of the socket in the rock shaft, thus permitting the rock shaft to turn within the hub. On the return of the rock shaft the key will again find its socket therein.

To facilitate the return of the key into its socket when displaced therefrom and also for the purpose of preventing any tendency of the rocker arm 22 to drop when the key is out of its socket, the rock shaft is provided with a flattened edge 48 adjacent the socket. When the key is displaced the end thereof will ride up and bear against this edge and by which bearing the relation between the rocker arm and shaft will be maintained and the arm prevented from dropping. The edge also facilitates the return of the key into its socket on the return of the rock shaft as previously described.

In order to prevent any lateral displacement of the rock shaft when the key is out of the socket in the shaft, a pin 50 is employed. This pin extends through the rock shaft with bearing against the side of the hub 23. The pin is preferably contained within a slot 51 cut in the side of the hub 23, which slot is made sufficiently large to permit of any necessary relative movement between the rock shaft and the hub for purposes above referred to.

To keep the rock shaft always tight within its bearings and prevent rattling, the under side of each of the bearings 4 beneath the rock shaft is provided with a sliding block 52 (see Figs. 8 and 9) which engages the under side of the shaft and, when pressure is applied, tends to hold the shaft in constant contact with the upper side of its bearings. Such pressure is applied to the blocks by means of springs 53 which rest upon feet 54 and 54' on the interior side of the casing and press against the sliding blocks with considerable degree of tension.

For the purpose of preventing the connections between the piston and the rocker arm 22 from rattling as they become worn, a double helical spring 55 is provided. The opposite ends of this spring are passed through eyes 56 in the spaced cheeks 17 of the piston with the central portion of the spring extending up over the ends 21 of the rocker arm 22 to be retained thereon by suitable slots or recesses 57. The tensional draw of this spring upon the parts thus connected tends to take up all wear and eliminate rattling.

Referring now to the means for controlling the passage of oil between the compression chamber 9 and the secondary or expansion chamber 10: The wall or partition 8 in the casing extends beneath the cylinder containing the compression chamber and forms the bottom wall of this chamber. Within the partition 8 at the lower end of the cylinder is located an opening 60 between the compression chamber and the secondary chamber which, as may be seen by reference to Fig. 2 extends beneath the partition 8. The opening 60 is controlled by a valve 61 of a well known type which permits of a free flow of oil from the secondary chamber into the cylinder when the piston is raised, but prevents the passage of oil through the opening when the piston moves in a reverse direction.

The partitions 7 and 8 co-operate with one another to form an extension passage 62 from the lower end of the compression chamber. This passage connects with the secondary chamber through a port 63 in the wall or partition 7. The port 63 is controlled by a vertically movable valve 64. For retaining the valve, it is provided at its bottom end with a spindle 65 extending through the port 63. The spindle carries a valve extension 66 which fits slidably within an opening in the wall or partition 8 for holding the valve in position from below. Above, the valve passes through the wall or partition 6 which provides a bearing for it, the valve being thereby maintained to be slidable vertically and occupy an open position with relation to the port 63 or a closed position with respect thereto. The upward or full open position of the valve is limited by a stop 67 on the lower end of the valve extension 66 and which engages the wall or partition 8. Above the wall or partition 6 the valve is provided with a weight 68. This weight has threaded attachment with the body of the valve and is held in place by a nut 69. For present purposes the weight may be considered to be part of the valve. The downward or closing movement of the valve is limited by the lower end of the weight 68 coming in contact with the wall or partition 6 through which the valve extends, such contact being made only when the valve has been moved downward sufficiently to occupy a full closed position.

The valve 64 is maintained to normally occupy an open position. This is done preferably by means of two springs, one a spring 70 interposed between the weight and the wall or partition 6 and the other a secondary spring 71 socketed in the top end of the valve and bearing against an arched spring 72 having a button 73 on it assisting in the retention of the spring 71. The spring 72 is retained by one end thereof resting upon a foot 74 on the side of the casing and the other or opposite end on corresponding footings 74' on wall of casing. The spring 72 is held down in depressed condition by a cam 75 on the lower side of the rocker arm hub 23, the spring 72 being under sufficient stress to maintain contact with the cam at all times. The springs 70 and 71 are preferably of such tension that they will maintain the weighted valve open to the limit defined by the stop and, also, in a condition of substantial balance, the spring 71 being lighter than the spring 70. The shape of the cam 75 is such that as the hub is turned by a movement occasioning an upward movement of the rocker arm 22 and piston, the spring 72 will become depressed contracting the spring 71 and thereby tending to move the valve downwardly in the direction of the port or opening 63, this becoming an absolute movement as the inertia of the valve is overcome. When the pressure thus occasioned by the cam is relieved upon the reverse movement of the hub, the valve will return to its initial open position. Even if the spring 70 holds the valve slightly out of balance against the stop its substantial balance will be obtained when the spring 71 becomes contracted by the cam so as to enable the valve to function as will later be described.

Whatever its position may be, the valve will be unaffected by the fluid pressure as the area of the bottom face of the valve equals that of the top face of the valve extension 66.

Besides the openings before referred to between the compression chamber and the secondary or expansion chamber, there is also preferably employed a by-pass 77 at the end of the extension 62 from the compression chamber. This by-pass is controlled by an adjustable valve 78 which extends through the wall of the casing and is threaded therein, the valve being thereby adjustable to permit of different degrees of opening of the by-pass and being fixed in any adjusted position by means of a nut 79.

In order to permit of the introduction of the various parts adjacent the valve inside the casing, it is provided with a removable side plate 80 sufficiently large for the purpose. Among other elements the pilot weight is introduced through this opening while the valve 64 is introduced through the opening 14 below, this opening being afterward closed by the plug 15.

The operation is as follows:—

It will be assumed that all the parts of the shock absorber are in normal position with the valve 64 open and the piston occupying a position about midway the cylinder, and that the vehicle with its axle in normal relation to the body is passing over a road surface having a large number of small inequalities not in themselves sufficient to cause a rebound. In passing these inequalities the axle in following the contour of the ground is rapidly vibrated up and down with a small range of movement. The rocker arm 22 and piston with it have a corresponding movement; likewise the rocker arm cam 75 and cam spring 72 partake of this reflected vibration of small range. Due, however, to small variation in stress and the rapidity with which it takes place the comparatively heavyweighted valve 64 is only slightly influenced and consequently the valve remains in its normal open position. In this position of the valve there is free communication by way of port 63 between the compression chamber 9 and the secondary chamber 10, thereby permitting a free vibration of the piston without interference with the resiliency of the vehicle springs.

It will now be assumed that the vehicle encounters a raised obstruction in the roadway of sufficient height and width to produce under ordinary circumstances a violent rebound. The vehicle and shock absorber with it reaches the obstruction with all its parts in substantially normal position, and as the wheels mount the rise the axle is brought nearer to the body of the vehicle compressing the vehicle springs. Simultaneously with the rise of the axle the hub 23 is turned lifting the rocker arm 22 which raises the piston in the cylinder and oil is drawn into the compression chamber below the piston from the secondary chamber by way of the opening 60. Simultaneously with this movement, as the hub 23 is turned, the cam 75 thereon will depress the cam spring 72, thereby contracting the secondary spring 71 and tending to depress the valve 64 in the direction of the port 63. The heavy compression of the vehicle springs now tends to project the vehicle body violently upward and with it the absorber casing. As the casing moves upward with the vehicle body the weighted valve tends to lag behind and completes the closing of the port. At this same time the piston will tend to have a downward return movement in the cylinder. The closing of the valve prevents the return of oil under pressure of the piston from the compression chamber to the secondary chamber by way of the port 63. Across the top of the rise, therefore, the vehicle springs will be held in a state of compression and the rebound prevented, as the oil can escape only slowly by way of the by-pass 77. As the wheels descend on the further side of the obstruction the weighted valve regains its normal position in the casing, permitting the oil to pass out of the compression chamber through the port 63 and thereby enabling the vehicle springs to expand to their normal.

In case the normal suspension of the valve 64 is such that it is maintained in a wide open position with the stop 67 bearing against the under side of the partition 8, which limits the upward travel of the valve, the results are identically the same, since the action of the secondary spring changes the adjustment tension with which the valve is held against the stop in unison with the movement of the axle with reference to the vehicle body.

In case the secondary spring, cam spring and cam are dispensed with, as shown in Fig. 6, reliance must be placed for operating the valve solely upon the upward movement of the vehicle body and lag of the weighted valve due to its inertia. The operation of the valve would then require a somewhat greater movement of the body to effect the objective, and would be less sensitive and accurate as compared with the operation previously described.

A case exactly opposite to the preceding will now be described, where the vehicle passes a wide and deep depression in the roadway. The vehicle and shock absorber with it approaches as before with all the parts in substantially normal position. Due to the inertia of the vehicle body, when the wheels go into the depression the axle moves down and away from the vehicle body. As this movement of the axle takes place the piston moves downward in the cylinder, the fluid passing freely through the open port 63 into the secondary chamber. The rocker arm hub 23 will be turned to a position where the cam 75 will relieve its pressure on the spring 72 permitting the spring to rise, thereby relieving pressure upon the secondary spring 71 and permitting the spring 70 to raise the valve to its full open position as is permissible by the stop 67, if not then occupying such position. The port 63 being thus left open permits the oil below the piston to flow freely through the port into the secondary chamber, thereby allowing the piston to move freely downward and the vehicle springs to expand above their normal state of compression, thus maintaining the vehicle body at nearly its former level. As the wheels pass the bottom of the hollow the port 63 is still open and the vehicle springs remain expanded maintaining the body well up in position. The wheels now strike the rise on the opposite side of the hollow and thereupon the parts regain their normal relative positions, and the actions in passing the top of the upward incline onto the level roadway are substantially the same as in the case of the raised obstruction previously described, though less in degree.

Having thus fully described my invention, I claim and desire to secure by Letters Patent of the United States:—

1. A fluid-check shock absorber for controlling the movement of relatively movable parts, an element attachable to one of said parts and having a fluid-containing pressure chamber and a secondary chamber with a port of communication between said chambers, a movable piston attachable to the other of said parts and reciprocable within said pressure chamber, means for attaching the piston, means whereby the piston may pass freely within the pressure chamber in one direction, a weighted valve for controlling said port and the passage of fluid therethrough upon the reverse movement of said piston, and means for supporting said valve from off said chambered element to occupy normally a substantially balanced open position relatively to said port whereby the valve may automatically be influenced to assist in the control of said port by its own inertia.

2. A fluid-check shock absorber for controlling the movement of relatively movable parts, an element attachable to one of said parts and having a fluid-containing pressure chamber and a secondary chamber with a port of communication between said chambers, a movable piston attachable to the other of said parts and reciprocable within said pressure chamber, means for attaching the piston, means whereby the piston may pass freely within the pressure chamber in one direction, a weighted valve for controlling said port and the passage of fluid therethrough upon the reverse movement of said piston, means whereby the fluid pressure will exert no substantial disturbing influence upon said valve during the operation of the piston, and means for supporting said valve from off said chambered element to occupy normally a substantially balanced open position relatively to said port whereby the valve may automatically be influenced to assist in the control of said port by its own inertia.

3. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, means whereby fluid may freely pass into said pressure chamber from said secondary chamber when said piston moves in one direction, and a weighted valve possessing inertia for controlling said port and the passage of fluid therethrough upon the reverse movement of said piston, and means for supporting said valve from off said chambered element to occupy normally a substantially balanced open position relatively to said port whereby it may automatically be influenced to assist in the control of said port by its own inertia.

4. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, a weighted valve for controlling said port and the passage of fluid therethrough upon the reverse movement of said piston, means for supporting and arranging said valve from off said chambered element whereby when it and said chambered element are subjected to a common force tending to displace the same in a verticle direction said chambered element will move relatively to said weighted valve due to the inertia of said valve and the valve thereupon automatically control said port.

5. A fluid-check shock absorber for controlling the movement of relatively movable parts comprising; an element attachable to one of said parts and having a fluid-containing pressure chamber and a secondary chamber with a port of communication between said chambers, a movable piston attachable to the other of said parts and reciprocable within said pressure chamber, means for attaching the piston, means whereby the piston may move freely within the pressure chamber in one direction, a weighted valve for controlling said port and the passage of fluid therethrough upon the reverse movement of said piston, means for supporting and arranging said valve from off said chambered element whereby when it and said chambered element are subjected to a common force tending to displace the same in a vertical direction said chambered element will move relatively to said weighted valve due to the inertia of said valve and the valve thereupon automatically control said port upon the reverse movement of the piston as aforesaid.

6. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means whereby the piston may move freely within the pressure chamber in one direction, a weighted valve for controlling said port and the passage of fluid therethrough upon the reverse movement of said piston, means for resiliently supporting said valve to occupy normally an open position relatively to said port whereby when said valve and chambered element are subjected to a common force tending to displace the same in a vertical direction said chambered element will move relatively to said valve due to the inertia of said valve and thereby the port in said chambered element become closed by the valve.

7. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, a weighted valve for controlling said port and the passage of fluid therethrough upon the reverse movement of said piston, a stop defining the open position of said valve, means for supporting and arranging said valve to occupy normally a substantially balanced open position determined by said stop whereby when said valve and chambered element are subjected to a common force tending to displace the same in a vertical direction said chambered element will move relatively to said valve due to the inertia of the valve and thereby the port of said chambered element become closed by the valve.

8. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, a weighted valve for controlling said port and the passage of fluid therethrough during the operation of said piston, means for supporting and arranging said valve from off said chambered element to occupy normally an open position relatively to said port whereby said valve when subjected to force tending to move it in the direction of said port will automatically assist in the control of said port by its own inertia, and means whereby the valve will be subjected to force tending to move it in the direction of said port during the operation of the piston.

9. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, a weighted valve for controlling said port and the passage of fluid therethrough during the operation of said piston, means for supporting and arranging said valve from off said chambered element to occupy normally a substantially balanced open position relatively to said port whereby said valve when subjected to force tending to unbalance and move the valve in the direction of said port will automatically assist in the control of said port by its own inertia, and means whereby the valve will be subjected to force tending to unbalance and move the same in the direction of said port during the operation of the piston.

10. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, a weighted valve for controlling said port and a passage of fluid therethrough during the operation of said piston, means for supporting and arranging said valve from off said chambered element to occupy normally an open position relatively to said port whereby said valve when subjected to force moving it in close proximity to said port will automatically assist in the control of said port by its own inertia, and means for moving the valve whereby it will function as aforesaid during the operation of the piston.

11. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, a weighted valve for controlling said port and the passage of fluid therethrough during the operation of said piston, means for supporting and arranging said valve from off said chambered element to occupy normally an open position relatively to said port whereby said valve when subjected to force tending to move it in the direction of said port will automatically assist in the control of said port by its own inertia, a stop defining the open position of said valve, and means whereby the valve will be subjected to force tending to move it in the direction of said port during the operation of the piston.

12. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, a weighted valve for controlling said port and the passage of fluid therethrough during the operation of said piston, a stop defining the open position of said valve, means for supporting and arranging said valve from off said chambered element to occupy normally a substantially balanced open position determined by said stop whereby said valve when subjected to force tending to unbalance and move the valve in the direction of said port will automatically assist in the control of said port by its own inertia, and means whereby the valve will be subjected to force tending to unbalance and move the same in the direction of the port during the operation of the piston.

13. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, means for attaching the piston, a weighted valve for controlling said port and the passage of fluid therethrough during the operation of said piston, a stop defining the open position of the valve, means for supporting and arranging said valve from off said chambered element to occupy normally an open position determined by said stop and whereby said valve when subjected to force moving it in closer proximity to said port will automatically assist in the control of said port by its own inertia, and means for moving the valve whereby it will function as aforesaid during the operation of the piston.

14. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, a flexible mechanism by which said piston is secured to and operated from off said other of the parts, a valve for controlling said port, means for supporting said valve from off said chambered e'ement, and means operative from off said flexible mechanism assisting in the functioning of said valve.

15. A fluid-check shock absorber for controlling the movement of relatively movable parts comprising, an element attachable to one of said parts and having a fluid-containing pressure chamber and a secondary chamber, with a port of communication between said chambers, a movable piston attachable to the other of said parts and reciprocable within said pressure chamber, a flexible mechanism by which said piston is secured to and operated from off said other of the parts, a valve for controlling said port, means for supporting and arranging said valve to have normally an open position, and means operative from off said flexible mechanism and assisting in the closing of said valve.

16. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, a flexible mechanism by which said piston is secured to and operated from off said other of the parts, a weighted valve for controlling said port and the passage of fluid therethrough, means for supporting and arranging said valve from off said chambered element to occupy normally a substantially balanced open position relatively to said port whereby it may automatically be influenced to assist in the control of said port by its own inertia, and means operative from off said flexible mechanism assisting in the functioning of said vave.

17. A fluid-check shock absorber for controlling the movement of relatively movable parts comprising, an element attachable to one of said parts and having a fluid-containing pressure chamber and a secondary chamber with a port of communication between said chambers, a movable piston attachable to the other of said parts and reciprocable within said pressure chamber, a flexible mechanism by which said piston is secured to and operated from off said other of the parts, said mechanism having a rocker arm, hub and cam carried by the hub, a valve for controlling said port, means for supporting said valve from off said chambered mechanism to occupy normally an open position, mechanism operative from off said cam and tending to depress said valve in the direction of said port during the operation of the piston.

18. In a fluid-check shock absorber for controlling the movement of relatively movable parts, the combination comprising, a casing attachable to one of said parts and having within it a cylinder and outside the cylinder a secondary chamber with a port of communication between the same, valvular mechanism for controlling said port, a piston reciprocable within the cylinder and attachable to the other of said parts, a flexible mechanism connecting said piston with the said other of the parts and having within it a rock shaft and rocker arm, and means for flexible connecting said rocker arm to said rock shaft whereby they may become automatically disconnected in the event of excessive strains and reconnected when said strains are relieved.

19. In a fluid-check shock absorber for controlling the movement of relatively moveable parts, the combination comprising, a casing attachable to one of said parts and having within it a cylinder and outside the cylinder a secondary chamber with a port of communication between the same, valvular mechanism for controlling said port, a piston reciprocable within the cylinder and attachable to the other of said parts, a flexible mechanism connecting said piston with the said other of the parts and having a rocker arm and rock shaft to which said arm is connected, and a spring-pressed key connecting the arm to said shaft and functioning substantially as described.

20. In a fluid-check shock absorber for controlling the movement of relatively movable parts, the combination comprising a casing attachable to one of said parts and having within it a cylinder and outside the cylinder a secondary chamber with a port of communication between the same, valvular mechanism for controlling said port, a piston reciprocable within the cylinder and attachable to the other of said parts, a flexible mechanism connecting said piston with the said other of the parts and having a rocker arm, a link connection between it and said piston, and a resilient member connected to said piston and passing over the end of said rocker arm for taking up lost motion between the parts substantially as described.

JAMES S. LANG.